United States Patent
Miles

(10) Patent No.: US 6,811,133 B2
(45) Date of Patent: Nov. 2, 2004

(54) HYDRAULICALLY AMPLIFIED PZT MEMS ACTUATOR

(75) Inventor: Robin R. Miles, Danville, CA (US)

(73) Assignee: The Regents of the University of California, Oakland, CA (US)

( * ) Notice: Subject to any disclaimer, the term of this patent is extended or adjusted under 35 U.S.C. 154(b) by 157 days.

(21) Appl. No.: 10/218,890

(22) Filed: Aug. 14, 2002

(65) Prior Publication Data

US 2003/0201416 A1 Oct. 30, 2003

Related U.S. Application Data

(60) Provisional application No. 60/377,116, filed on Apr. 30, 2002.

(51) Int. Cl.[7] ............................................... F16K 31/12
(52) U.S. Cl. ..................... 251/57; 251/61.1; 251/129.06
(58) Field of Search ...................... 251/57, 61.1, 129.06

(56) References Cited

U.S. PATENT DOCUMENTS

| | | | |
|---|---|---|---|
| 4,237,224 A | 12/1980 | Cohen et al. | |
| 5,171,132 A | 12/1992 | Miyazaki et al. | |
| 5,252,743 A | 10/1993 | Barrett et al. | |
| 5,272,724 A | 12/1993 | Solomon et al. | |
| 5,445,008 A | 8/1995 | Wachter et al. | |
| 5,572,052 A | * 11/1996 | Kashihara et al. | 257/295 |
| 5,610,898 A | * 3/1997 | Takimoto et al. | 369/126 |
| 6,062,532 A | * 5/2000 | Gurich et al. | 251/57 |
| 6,068,751 A | 5/2000 | Neukermans | |
| 6,146,103 A | 11/2000 | Lee et al. | |
| 6,352,838 B1 | 3/2002 | Krulevitch et al. | |

* cited by examiner

*Primary Examiner*—Edward K. Look
*Assistant Examiner*—John K. Fristoe, Jr.
(74) *Attorney, Agent, or Firm*—Eddie E. Scott; Alan H. Thompson

(57) ABSTRACT

A hydraulically amplified microelectromechanical systems actuator. A piece of piezoelectric material or stacked piezo bimorph is bonded or deposited as a thin film. The piece is operatively connected to a primary membrane. A reservoir is operatively connected to the primary membrane. The reservoir contains a fluid. A membrane is operatively connected to the reservoir. In operation, energizing the piezoelectric material causing the piezoelectric material to bow. Bowing of the piezoelectric material causes movement of the primary membrane. Movement of the primary membrane results in a force in being transmitted to the liquid in the reservoir. The force in the liquid causes movement of the membrane. Movement of the membrane results in an operating actuator.

17 Claims, 1 Drawing Sheet

HYDRAULICALLY AMPLIFIED PZT MEMS ACTUATOR

CROSS-REFERENCE TO RELATED APPLICATIONS

This application claims the benefit of U.S. Provisional Application No. 60/377,116, filed Apr. 30, 2002, titled "A Hydraulically Amplified PZT MEMS Actuator." U.S. Provisional Application No. 60/377,116, filed Apr. 30, 2002, titled "A Hydraulically Amplified PZT MEMS Actuator" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to microfluidic systems and more particularly to a hydraulically amplified microelectromechanical systems actuator.

2. State of Technology

U.S. Pat. No. 6,068,751 for a microfluidic valve and integrated microfluidic system to Armand P. Neukermans, issued May 30, 2000, provides the following background information, "Various efforts are underway to build miniature valves and pumps in silicon for micro-fluidics. It is however proving to be difficult to produce good sealing surfaces in silicon, and it turns out that these valves, although in principle mass-produced on a silicon wafer, become expensive in their packaged finished form. Consequently, such micro-fluidic components can hardly be considered inexpensive and/or disposable. Moreover, in such micro-fluidic components liquid contacts the valve and pump bodies and passages, thereby creating a contamination problem if the micro-fluidic component is to be reused. In addition, these micro-fluidic valves still must be interconnected into systems, and such interconnection also becomes expensive. This interest in micro-fluidic components has been s, purred largely by the rapid developments in the medical and biological sciences and related fields. In many such applications, small amounts of liquids need to be dispensed, samples need to be introduced and mixed in a given sequence with a variety of reagents, and the reagent products need to be examined for the presence or absence of particular species. In addition, obtaining good analytic results often requires that the dead volume associated with valving and tubing be extremely small. Examples of processes which would benefit from a micro-fluidic system are immunoassay tests, or DNA tests for forensic applications, infectious or genetic diseases or screening for genetic defects."

U.S. Pat. No. 6,146,103 for micromachined magnetohydrodynamic actuators and sensors to Abraham P. Lee and Asuncion V. Lemoff, patented Nov. 14, 2000 provides the following background information: "Microfluidics is the field for manipulating fluid samples and reagents in minute quantities, such as in micromachined channels, to enable hand-held bioinstrumentation and diagnostic tools with quicker process speeds. The ultimate goal is to integrate pumping, valving, mixing, reaction, and detection on a chip for biotechnological, chemical, environmental, and health care applications."

U.S. Pat. No. 6,382,254 for a microfluidic valve and method for controlling the flow of a liquid to Zhihao Yang and Ravi Sharma, issued May 7, 2002, provides the following background information, "Microfluidic systems are very important in several applications. For example, U.S. Pat. No. 5,445,008 discloses these systems in biomedical research such as DNA or peptide sequencing. U.S. Pat. No. 4,237,224 discloses such systems used in clinical diagnostics such as blood or plasma analysis. U.S. Pat. No. 5,252,743 discloses such systems used in combinatorial chemical synthesis for drug discovery. U.S. Pat. No. 6,055,002 also discloses such systems for use in ink jet printing technology. Valves and pumps are the two most fundamental components in controlling the fluid dynamics in a microfluidic system. Various efforts have been made to build miniature valves and pumps for microfluidic systems by micro machining silicon. Several valves and pumps have been disclosed using mechanical actuators, such as piezoelectric actuators or spring-loaded magnetic actuators. Examples of these are disclosed in U.S. Pat. Nos. 6,068,751; 5,171,132; 5,272,724; UK Patent 2,248,891, and European Patent 568,902. However, there are problems with these mechanically actuated microfluidic devices since they are complex in design, difficult to fabricate and suffer from a lack of mechanical durability and reliability. In addition, these valves are prone to leak because there are problems in producing a good seal. These problems generally result in the high cost, low productivity, and inoperability of these microfluidic devices. The compatibility in fabrication of the microfluidic devices with the procedure of semiconductor chip manufacturing industry is another important issue in achieving low cost microfluidic systems with mass production. In addition, for those more sophisticated microfluidic systems, a complex micro-valves and pumps system is often necessary to regulate the liquid in the devices. Therefore, an on-chip integrated circuit to control the individual valves and pumps is highly desired. This also requires the microfluidic devices to be compatible with IC fabrication such as the Complementary Metal Oxide System (CMOS) fabrication in the semiconductor industry."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a hydraulically amplified microelectromechanical systems actuator. A piece of piezoelectric material or stacked piezo bimorph is bonded or deposited as a thin film. The piece is operatively connected to a primary membrane. In one embodiment the piezoelectric material is Lead Zirconate Titanate (PZT). A reservoir is operatively connected to the primary membrane. The reservoir contains a fluid. A membrane is operatively connected to the reservoir. In operation, the microelectromechanical systems actuator utilizes the piezoelectric material, the primary membrane, the reservoir which contains a fluid, and the membrane to provide a microelectromechanical systems actuating method. Energizing the piezoelectric material causing the piezoelectric material to bow. The bowing of the piezoelectric material causes movement of the primary membrane. Movement of the primary membrane results in a force in being transmitted to the liquid in the reservoir. The force in the reservoir causes movement of the membrane. Movement of the membrane results in an operating actuator.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
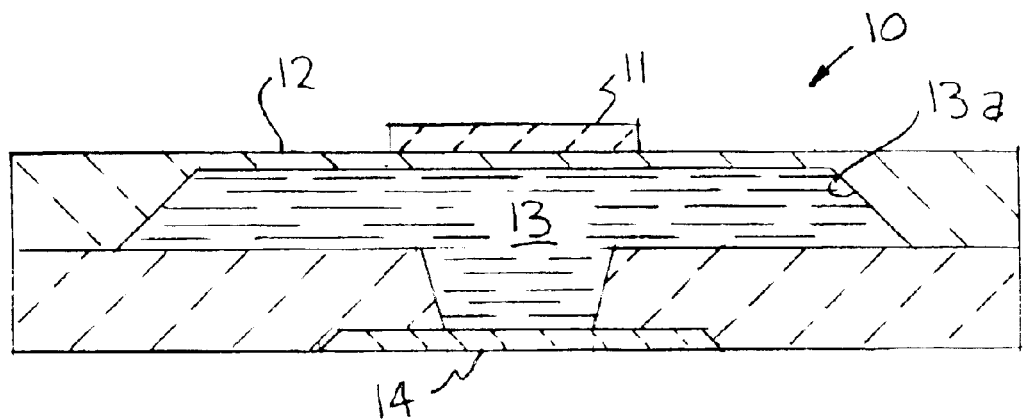
FIG. 1 illustrates a hydraulically amplified microelectromechanical systems actuator.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings, and in particular to FIG. 1, a hydraulically amplified microelectromechanical systems (MEMS) actuator system is illustrated. The actuator system is designated generally by the reference numeral 10. The system 10 has use in micro fluidic systems as valves, pumps, and mixers such as those needed to mix reagents and samples for bio-detection. For example, the system 10 can be used for sample preparation for a flow cytometer or a PCR. Examples of other uses include drug delivery and chemical analysis. One embodiment of the system 10 is as a control valve for a myriad of applications including fuel injection systems, flow and pressure control, and miniature on-off pneumatic valves.

There is much effort being directed to produce microfluidic systems for a variety of commercial uses including biological and chemical analysis. Most of the actuators have been thermally based actuators. These include thermohydrualic actuators, thermal bimorph actuators, and shape-memory alloy devices. All these actuators consume a large amount of power (on the order of 1–2 Watts). Such a large power consumption make these systems impractical for field use. Piezoelectric actuators are low power consumption devices, and have been used in many control valve concepts. Usually, many sheets of piezoceramic are stacked up to increase the deflection of the actuator. This results in an expensive design. Further, the piezoceramic is not always compatible with the fluid being controlled. The system 10 allows for the amplification of the piezoelectric motion without the requirement of a stack or higher applied voltages and isolates the piezoelectric material from the working fluid. The system 10 uses a two stage actuation method, the first of which is piezoelectric and the second of which is hydraulic.

The system 10 provides a hydraulically amplified microelectromechanical systems actuator. A piece 11 of piezoelectric material or stacked piezo bimorph is bonded or deposited as a thin film. The piece 11 is operatively connected to a primary membrane 12. The piece 11 in one embodiment is in itself the primary membrane 12. In one embodiment the piezoelectric material 11 is Lead Zirconate Titanate (PZT).

A reservoir 13 is operatively connected to the primary membrane 12. The reservoir 13 contains a fluid 13A. A membrane 14 is operatively connected to the reservoir 13. The membrane 14 serves as an actuator or a separate actuator can be operatively connected to the membrane 14. In operation, the microelectromechanical systems actuator 10 utilizes the piezoelectric material 11, the primary membrane 12, the reservoir 13 which contains a fluid 13A, the membrane, and the actuator to provide a microelectromechanical systems actuating method that includes the steps, energizing the piezoelectric material 11 causing the piezoelectric material 11 to bow. The bowing of the piezoelectric material 11 causes movement of the primary membrane 12. Movement of the primary membrane 12 resulting in a force in being transmitted to the liquid 13A in the reservoir 13. The force in the reservoir 13 causes movement of the membrane 14. Movement of the membrane 14 produces movement of the actuator. The membrane 14 in one embodiment is in itself the actuator.

The system 10 operates on the principal that a charged piezoelectric material 11 when attached to a thin membrane 12 of some other material will bow. This deflection can be amplified or reduced by creating a fluid-filled cavity 13, one wall of which is the membrane 12 with the piezoelectric material 11 attached, and another wall is a flexible membrane 14 of different size. Any other sides of the reservoir 13 are rigid. The degree of amplification provided by the system 10 depends on the ratios of the areas of the two membranes 12 and 14. Smaller secondary membranes 14 will deflect more than the piezo-membrane 12.

Figure 2:
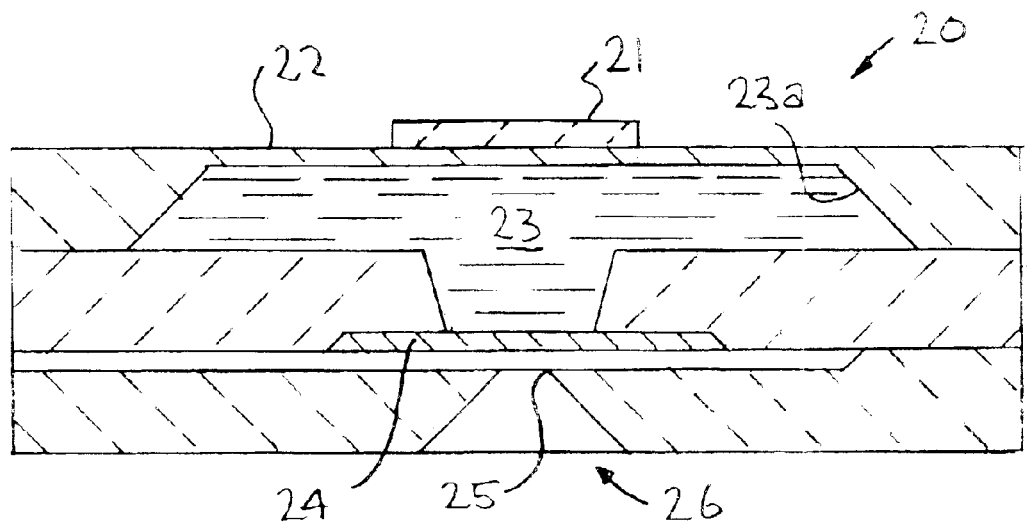
FIG. 2 illustrates another embodiment of a hydraulically amplified microelectromechanical systems actuator.

Referring now to FIG. 2, another embodiment of a hydraulically amplified microelectromechanical systems (MEMS) actuator system is illustrated. This actuator system is designated generally by the reference numeral 20. The system 20 comprises of a piece 21 of piezoelectric material or stacked piezo bimorph bonded or deposited as a thin film to a thin flexible diaphragm 22 of material. In the embodiment shown in FIG. 2, this diaphragm 12 is etched silicon, but it is to be understood that the material does not have to be silicon. A cavity 23 is formed with a second flexible membrane 24. In the embodiment shown in FIG. 2, the second membrane 24 is silicone, but again, this choice of material is application dependent. The other walls of the reservoir 23 are rigid. The reservoir 23 is filled with a relatively incompressible fluid 23A. When an electric charge is placed across the piezoelectric material, the primary membrane 22 will bow. The secondary membrane 24 will deflect in accordance with the volume of fluid 23A displaced when the primary membrane 22 is deflected. If the area of the secondary membrane 24 is smaller than the primary 22, the secondary membrane 24 will deflect more.

The secondary membrane 24 is utilized as an actuator 25. The secondary membrane 24 or actuator can be made to open and close against a valve seat 25 to make a valve 26 as illustrated in FIG. 2, or in another embodiment can be used to make a pump or mixer. In another embodiment illustrated using the system 20 illustrated in FIG. 2, a normally closed valve 26 can be made using the configuration shown with the secondary membrane 24 or actuator in the extended position. The cavity/reservoir 23 is filled in such a manner that when the piezoelectric material 21 is being excited that the membranes 22 and 24 deflect upwards.

The system 20 has use in micro fluidic systems as valves, pumps, and mixers such as those needed to mix reagents and samples for bio-detection. For example, the system 20 can be used for sample preparation for a flow cytometer or a PCR. Examples of other uses include drug delivery and chemical analysis. One embodiment of the system 20 is as a control valve for a myriad of applications including fuel injection systems, flow and pressure control, and miniature on-off pneumatic valves.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A hydraulically amplified microelectromechanical systems actuator, comprising:
   a micro fluidic system having
   an operating member in the form of a thin film of piezoelectric material,
   a primary membrane directly connected to said operating member,
   a reservoir directly connected to said primary membrane,
   a fluid in said reservoir, and
   an actuator member in the form of a membrane directly connected to said reservoir.

2. The hydraulically amplified microelectromechanical systems actuator of claim 1, wherein said operating member is a piezoelectric material that is bonded directly to said primary membrane.

3. The hydraulically amplified microelectromechanical systems actuator of claim 2, wherein said piezoelectric material is lead zirconate titanate.

4. The hydraulically amplified microelectromechanical systems actuator of claim 1, wherein said operating member is stacked piezo bimorph bonded as a thin film.

5. The hydraulically amplified microelectromechanical systems actuator of claim 1, wherein said operating member is stacked piezo bimorph deposited as a thin film.

6. The hydraulically amplified microelectromechanical systems actuator of claim 1, wherein said actuator member is a membrane that is directly connected to said reservoir and is in direct contact with said fluid.

7. The hydraulically amplified microelectromechanical systems actuator of claim 1, wherein said actuator member is a membrane that is directly connected to said reservoir and is in direct contact with said fluid and that includes an actuator operatively connected to said membrane.

8. The hydraulically amplified microelectromechanical systems actuator of claim 1, wherein said fluid is an incompressible fluid.

9. The hydraulically amplified microelectromechanical systems actuator of claim 1, wherein said actuator member is a membrane that is directly connected to said reservoir and is in direct contact with said fluid and that includes an actuator operatively connected to said membrane with a valve seat directly connected to said membrane.

10. The hydraulically amplified microelectromechanical systems actuator of claim 1, wherein said primary membrane has first size and said membrane has a second size an wherein said first and second size are different.

11. The hydraulically amplified microelectromechanical systems actuator of claim 10, wherein said first size is larger than said second size.

12. An microelectromechanical systems actuating method utilizing a thin film of piezoelectric material, a primary membrane, a reservoir containing a fluid, a membrane, and an actuator, comprising the steps of:
   positioning said thin film of piezoelectric material directly on said primary membrane,
   positioning said primary membrane directly on said reservoir in direct contact with said fluid,
   positioning said membrane directly on said reservoir in direct contact with said fluid,
   positioning said actuator directly on said membrane,
   energizing said piezoelectric material causing said piezoelectric material to bow and causing movement of said primary membrane,
   said movement of said primary membrane resulting in a force in said liquid in said reservoir,
   said force in said liquid causing movement of said membrane, and
   said movement of said membrane causing movement of said actuator.

13. The microelectromechanical systems actuating method of claim 12, wherein said step of energizing said piezoelectric material includes providing an electric current to said piezoelectric material.

14. The microelectromechanical systems actuating method of claim 13, wherein said piezoelectric material is lead zirconate titanate.

15. The microelectromechanical systems actuating method of claim 12, wherein said primary membrane has first size and said membrane has a second size an wherein said first and second size are different.

16. The microelectromechanical systems actuating method of claim 15, wherein said first size is larger than said second size resulting in said movement of said actuator is greater than said movement of said primary membrane.

17. The microelectromechanical systems actuating method of claim 12, wherein said actuator is connected to a valve and said movement of said actuator causes actuation of said valve.

* * * * *